(12) United States Patent
Gallo

(10) Patent No.: US 8,736,193 B2
(45) Date of Patent: May 27, 2014

(54) THRESHOLD-BASED ZERO-CROSSING DETECTION IN AN ELECTRICAL DIMMER

(75) Inventor: Marc Gallo, Bayside, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 221 days.

(21) Appl. No.: 13/334,705

(22) Filed: Dec. 22, 2011

(65) Prior Publication Data

US 2013/0162167 A1    Jun. 27, 2013

(51) Int. Cl.
*G05F 1/00* (2006.01)

(52) U.S. Cl.
USPC .......................................................... 315/291

(58) Field of Classification Search
USPC .............. 315/291, 307, 308, 224, 360, 209 R
See application file for complete search history.

(56) References Cited

U.S. PATENT DOCUMENTS

| | | |
|---|---|---|
| 3,678,291 A | 7/1972 | Coe |
| 4,010,386 A | 3/1977 | Rossell |
| 4,096,884 A | 6/1978 | Horowitz |
| 4,296,449 A | 10/1981 | Eichelberger |
| 4,365,164 A | 12/1982 | Sibley |
| 4,396,869 A | 8/1983 | Rosenbaum et al. |
| 4,427,863 A | 1/1984 | Fujita |
| 4,581,705 A | 4/1986 | Gilker et al. |
| 4,675,987 A | 6/1987 | Minks et al. |
| 4,739,351 A | 4/1988 | Feldman |
| 4,829,457 A | 5/1989 | Russo et al. |
| 4,835,502 A | 5/1989 | Minnette |
| 5,258,889 A | 11/1993 | Belanger, Jr. |
| 5,335,135 A | 8/1994 | Kinney |
| 5,336,979 A | 8/1994 | Watson et al. |
| 5,338,908 A | 8/1994 | Rahman et al. |
| 5,359,486 A | 10/1994 | Crane et al. |
| 5,619,081 A | 4/1997 | Gershen et al. |
| 5,644,463 A | 7/1997 | El-Sharkawi et al. |
| 5,784,285 A | 7/1998 | Tamaki et al. |

(Continued)

FOREIGN PATENT DOCUMENTS

| | | |
|---|---|---|
| EP | 0039869 A1 | 4/1981 |
| EP | 2214287 A2 | 8/2010 |

(Continued)

OTHER PUBLICATIONS

Leviton, Product Data "Z-MAX Relay Cards," 2009, 2 pages.

(Continued)

*Primary Examiner* — Minh D A
(74) *Attorney, Agent, or Firm* — Claudio Buttitta, Esq.; Matthew M. Hulihan, Esq.; Heslin Rothenberg Farley & Mesiti P.C.

(57) ABSTRACT

Threshold-based zero-crossing detection is provided. A power phase threshold detector detects when absolute value of a voltage level of the electrical power rises above a non-zero voltage threshold and outputs a zero-crossing signal to a controller to indicate occurrence of the zero-crossing. Delaying the zero-crossing signal to the point when the absolute value of the voltage level of the electrical power rises above the non-zero voltage threshold ensures completion of the zero-crossing of the power phase prior to signaling the controller. The controller provides signals to a switching circuit for controlling switching of electrical power to a load based on the zero-crossing indications.

22 Claims, 5 Drawing Sheets

(56) References Cited

U.S. PATENT DOCUMENTS

| | | | |
|---|---|---|---|
| 5,814,966 | A | 9/1998 | Williamson et al. |
| 5,847,555 | A * | 12/1998 | Lewis ........................... 323/299 |
| 5,930,104 | A | 7/1999 | Kadah et al. |
| 5,971,597 | A | 10/1999 | Baldwin et al. |
| 6,002,313 | A | 12/1999 | Mrenna et al. |
| 6,188,181 | B1 | 2/2001 | Sinha et al. |
| 6,198,063 | B1 | 3/2001 | Kramer |
| 6,232,855 | B1 | 5/2001 | Malingowski et al. |
| 6,233,132 | B1 | 5/2001 | Jenski |
| 6,456,511 | B1 | 9/2002 | Wong |
| 6,497,656 | B1 | 12/2002 | Evans et al. |
| 6,512,682 | B2 | 1/2003 | Cohen et al. |
| 6,525,542 | B2 | 2/2003 | Price |
| 6,633,823 | B2 | 10/2003 | Bartone et al. |
| 6,693,395 | B2 | 2/2004 | Wilhelm |
| 6,724,157 | B2 | 4/2004 | Kazanov et al. |
| 6,741,442 | B1 | 5/2004 | McNally et al. |
| 6,768,615 | B2 | 7/2004 | Liu |
| 6,897,760 | B2 | 5/2005 | Kawata et al. |
| 6,903,554 | B2 | 6/2005 | Wilson et al. |
| 6,993,417 | B2 | 1/2006 | Osann, Jr. |
| 7,046,716 | B1 | 5/2006 | Miao |
| 7,110,225 | B1 | 9/2006 | Hick |
| 7,141,891 | B2 | 11/2006 | McNally et al. |
| 7,171,461 | B2 | 1/2007 | Ewing et al. |
| 7,190,125 | B2 * | 3/2007 | McDonough et al. ......... 315/291 |
| 7,196,900 | B2 | 3/2007 | Ewing et al. |
| 7,236,338 | B2 | 6/2007 | Hale et al. |
| 7,242,563 | B2 | 7/2007 | Hua et al. |
| 7,368,830 | B2 | 5/2008 | Cleveland et al. |
| 7,538,645 | B2 | 5/2009 | Nishi et al. |
| 7,683,755 | B2 | 3/2010 | Ostrovsky et al. |
| 2001/0039626 | A1 | 11/2001 | Jauert |
| 2003/0062990 | A1 | 4/2003 | Schaeffer, Jr. et al. |
| 2003/0161279 | A1 | 8/2003 | Sherman |
| 2004/0034484 | A1 | 2/2004 | Solomita et al. |
| 2004/0054905 | A1 | 3/2004 | Reader |
| 2004/0155722 | A1 | 8/2004 | Pruchniak |
| 2005/0147071 | A1 | 7/2005 | Karaoguz et al. |
| 2005/0185669 | A1 | 8/2005 | Welborn et al. |
| 2005/0203987 | A1 | 9/2005 | Ewing et al. |
| 2005/0243787 | A1 | 11/2005 | Hong et al. |
| 2006/0007627 | A1 | 1/2006 | Lewis |
| 2006/0094461 | A1 | 5/2006 | Hameed et al. |
| 2006/0259538 | A1 | 11/2006 | Ewing et al. |
| 2007/0076340 | A1 | 4/2007 | Ewing et al. |
| 2007/0081505 | A1 | 4/2007 | Roberts |
| 2007/0112939 | A1 | 5/2007 | Wilson et al. |
| 2007/0130243 | A1 | 6/2007 | Ewing et al. |
| 2007/0136453 | A1 | 6/2007 | Ewing et al. |
| 2007/0140238 | A1 | 6/2007 | Ewing et al. |
| 2007/0198748 | A1 | 8/2007 | Ametsitsi |
| 2008/0019063 | A1 | 1/2008 | Muller et al. |
| 2008/0019068 | A1 | 1/2008 | Reynolds et al. |
| 2008/0112097 | A1 | 5/2008 | Maharsi |
| 2008/0136261 | A1 | 6/2008 | Mierta |
| 2009/0021213 | A1 | 1/2009 | Johnson |
| 2009/0027219 | A1 | 1/2009 | Ostrovsky et al. |
| 2009/0259603 | A1 | 10/2009 | Housh et al. |
| 2009/0285189 | A1 | 11/2009 | Kim et al. |
| 2010/0090618 | A1 * | 4/2010 | Veltman ........................ 315/307 |
| 2011/0080111 | A1 | 4/2011 | Nuhfer et al. |
| 2011/0115460 | A1 | 5/2011 | Elliott et al. |
| 2011/0118890 | A1 | 5/2011 | Parsons |
| 2011/0199014 | A1 | 8/2011 | Pitigoi-Aron et al. |
| 2011/0199017 | A1 | 8/2011 | Dilger |
| 2011/0204778 | A1 | 8/2011 | Sadwick et al. |
| 2011/0204820 | A1 | 8/2011 | Tikkanen et al. |
| 2011/0285301 | A1 * | 11/2011 | Kuang et al. .............. 315/200 R |
| 2013/0162168 | A1 | 6/2013 | Ostrovsky |

FOREIGN PATENT DOCUMENTS

| | | |
|---|---|---|
| JP | 2008302771 | 12/2008 |
| WO | 9010942 A1 | 9/1990 |
| WO | 0182321 A1 | 1/2001 |
| WO | 2006091565 A2 | 8/2006 |
| WO | 2008102147 A1 | 8/2008 |
| WO | 2011101282 A1 | 8/2011 |
| WO | 2011101680 A2 | 8/2011 |

OTHER PUBLICATIONS

Lighting Controls, "Lighting Control & Design-Product Catalog," Oct. 2008, 101 pages.
SVEA Building Control Systems—LON I/O Module REG-M DIM 1-10V, May 16, 2007, 4 pages.
Wattsupmeters, Smart Circuit, "Electricity Controller—Applications," Mar. 30, 2010, 2 pages.
Wattsupmeters, Smart Circuit, "Methodology for Commercial Applications," Mar. 30, 2010, 2 pages.
Wattsupmeters, Smart Circuit, "The Intelligent Electricity Monitor that can Measure and Switch Loads via the Internet," Mar. 30, 2010, 2 pages.
Wattsupmeters, Smart Circuit, "20 AMP Internet Enabled Electricity Controller," Product Information, 2005, 2 pages.
Written Opinion and International Search Report for PCT/US2010/044022, dated Feb. 24, 2011, 10 pages.
U.S. Appl. No. 12/751,956, filed Mar. 31, 2010, 87 pages.
ADMMicro EMS, "Controllers," 2006, 1 page.
ADMMicro, "What We Do," Controllers, 2006, 3 pages.
Architectural Lighting Magazine, "Load Shedding and Lighting: The New Frontier," printed Mar. 20, 2009, 2 pages.
E-Mon, Energy Monitoring Products, E-Mon D-Mon Metering Products, printed Jul. 7, 2009, 1 pages.
I.M.S. Industrial Measurement Systems Ltd., "General Information," 2006, 2 pages.
Leviton, "Architectural Lighting Controls," 2007, 21 pages.
Lutron, "Quantum—Whole-Building Light Management Solution," Apr. 30, 2009, 28 pages.
Quad Logic: Power Line Communications Technology, "Where There is Power . . . Quadlogic Brings You Knowledge," 2008, 2 pages.
Shadowmetering, "About Shadow Metering Inc. Jacksonville, Florida," 2009, 1 page.
Site Controls: Products and Services, "The Site-Command Platform," 2009, 1 page.
Wattsupmeters, "Smart Circuit—The Intelligent Electricity Monitor that Can Measure and Switch Loads via the Internet, Sep. 2005," 6 pages.
Society of Automotive Engineers, Inc., Surface Vehicle Recommended Practice, 2001, 32 pages.
GM Electric Power/Advanced Systems, "Plug-In Electric Vehicles—Standards," Ontario Smart Grid Forum, Oct. 14, 2008, 17 pages.
RS485 serial information, http://www.lammertbies.nl/comm/info/RS-485.html. 3 pages.
International Preliminary Report on Patentability for PCT/US2010/044022, dated May 15, 2012, 6 pages.
Elliott et al., Office Action for U.S. Appl. No. 12/751,993, filed Mar. 31, 2010, (U.S. Patent No. 8,324,761) dated May 10, 2012.
Elliott et al. Notice of Allowance for U.S. Appl. No. 12/751,993, filed Mar. 31, 2010, (U.S. Patent No. 8,324,761 dated Aug. 8, 2012.

* cited by examiner

THRESHOLD-BASED ZERO-CROSSING DETECTION IN AN ELECTRICAL DIMMER

BACKGROUND

In an electrical load dimmer, a technique known as zero-crossing detection is conventionally employed, wherein the dimmer is synchronized with one or more phases of an input line voltage to enable the dimmer to properly fire a load-controlling switch, such as a TRIAC, at specific Ftimes with respect to the input line phase. More specifically, a zero-crossing is detected by detecting a change in voltage polarity of the input line voltage. In other words, zero-crossing is detected when the input line voltage changes polarity at the zero volt level, which triggers a signal in the microprocessor that the voltage level has crossed zero volts.

In prior art designs, zero-crossings of an input line phase are detected by detecting a change in the polarity of the voltage across an input line terminal and an output load terminal (that is, in two-wire devices without a neutral connection), or across the input line terminal and return neutral or ground wire terminal (in three-wire devices with a neutral connection or two-wire devices using a ground leakage path).

BRIEF SUMMARY OF THE INVENTION

The prior art method of zero-crossing detection in two-wire devices (which have input line and output load terminals, but do not have a separate neutral connection or ground leakage path) can be problematic. For instance, the capacitive properties and switch-mode power supplies of loads, such as LED loads, can introduce fluctuations in the polarity of the load current. Consequently, zero-crossing detection via the traditional means of detecting a change in polarity can be inadequate. Multiple reversals of the polarity of the input-to-output voltage may occur near a zero-crossing, and these can cause a conventional zero-crossing detection circuit to falsely trigger.

The present invention addresses this problem by providing a threshold function to improve synchronization capabilities of a dimmer, and to avoid false triggering that occurs using the above-described approach. Rather than detecting position(s) where an input line voltage crosses zero, the present invention instead detects when the input line voltage reaches a defined positive (or negative) voltage threshold. By placing the threshold trigger point above (or below) the zero voltage level, false triggering due to voltage polarity reversals caused by the fluctuations in load current near zero voltage is advantageously avoided.

More specifically, the shortcomings of the prior art are overcome and additional advantages are provided through the provision of a dimmer for controlling AC electrical power to a load. The dimmer includes a line input terminal and a load output terminal, a switching circuit electrically coupled between the line input terminal and the load output terminal, and a threshold detector configured to detect when an absolute value of a voltage level of the AC electrical power rises above a non-zero voltage threshold indicative of an occurrence of a zero-crossing of the AC electrical power, and output a zero-crossing signal indicative of the occurrence of a zero-crossing of the AC electrical power, wherein the switching circuit is controlled at least partially by the zero-crossing signal output by the threshold detector.

In a further aspect, a method is provided for controlling AC electrical power to a load. The method includes detecting when an absolute value of a voltage level of the AC electrical power rises above a non-zero voltage threshold, the non-zero threshold being indicative of an occurrence of a zero-crossing of the AC electrical power, outputting a zero-crossing signal indicative of the occurrence of the zero-crossing of the AC electrical power, and providing power to the load based at least partially on the zero-crossing signal.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Disclosed herein are various dimmers for controlling electrical power to a load. As explained in detail below, in accordance with one aspect of the present invention, a threshold function is employed to provide zero-crossing indication(s) for use in controlling switching of the electrical power to the load.

Figure 1:
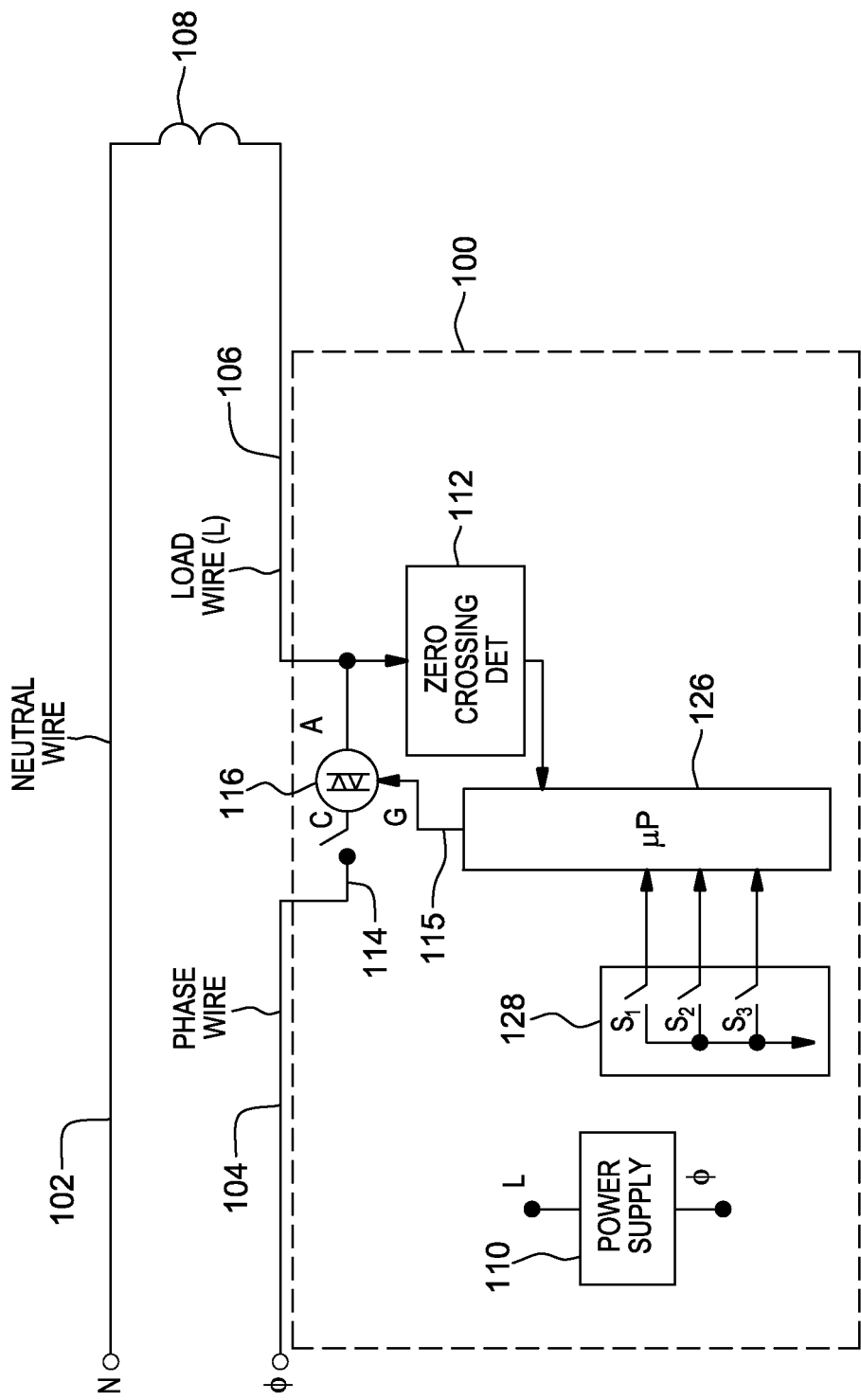
FIG. 1 depicts one example of a dimmer comprising a zero-crossing detection circuit facilitating controlling electrical power to a load.

FIG. 1 depicts one example of a dimmer comprising a zero-crossing detection circuit facilitating controlling electrical power to a load. In FIG. 1, load control switch 100 (also referred to herein as a "dimmer" or "dimmer switch") is able to activate, and control power to, an electrical device 108. Control switch 100 includes a microprocessor 126 coupled to user accessible actuators 128. Microprocessor 126 may include, but is not limited to, a complex instruction set computer processor and a reduced instruction set computer processor. A user of control switch 100 is able to engage one or more actuators of actuators 128, which microprocessor 126 may interpret as a command (or a set of commands) to perform one or more actions for controlling electrical device 108. In response to the received command information, control switch 100 can then control electrical device 108.

Dimmer switch 100 directly controls electrical device 108 shown in FIG. 1, such as a light fixture having a lighting element such as a bulb. Electrical device 108 can be any type of device that may be controlled by a switch. For example electrical device 108 can be a fan, a household appliance, or light fixture comprising a lighting element.

Dimmer 100 can control, for example, the amount of current flowing through electrical device 108 by proper activation of a Triode for Alternating Current (TRIAC) 116. TRIAC 116 is a bidirectional three terminal semiconductor device that allows bidirectional current flow when an electrical signal of proper amplitude is applied to its "G" (or gate) terminal. TRIAC 116 also has a "C" (or cathode terminal) and an "A" or anode terminal. When an electrical signal is applied to the gate G, TRIAC 116 is said to be gated. When properly gated, current (or other electrical signal) can flow from the "C" terminal to the "A" terminal or from the "A" terminal to the "C" terminal. When TRIAC is not gated or is not properly gated, relatively very little or substantially no current (or no signal) can flow between the "A" and "C" terminals. TRIAC 116 thus acts as an electrically controlled switch which can allow some or no current flow based on the amplitude of the electrical signal applied to its "G" terminal. Alternatively, TRIAC 116 can be implemented as two TRIACs TR1 and TR2 (not shown), where TRIAC TR1 is controlled by microprocessor 126 which applies a fire signal onto control line 115 to turn on TRIAC TR2, which in turn gates TRIAC TR1 allowing an AC signal to pass through electrical device 108 and back to the power source via neutral wire 102.

Connected in series to TRIAC 116 is mechanical switch 114. Mechanical switch 114 can be an "air gap switch" that can be activated to stop current flow through phase wire 104, load wire 106, electrical device 108 and neutral wire 102. Electrical energy from a source (not shown) provides current that flows from phase terminal (O) through wire 104, mechanical switch 114, TRIAC 116, load wire 106, electrical device 108, neutral wire 102 and back to the electrical energy source through neutral terminal N. The amount of current flowing through the phase and neutral wires will determine the intensity of the electrical device. TRIAC 116 can be gated to provide current amounts related to intensities of electrical device 108 (for example intensity of the light if electrical device 108 comprises a lighting element, fan speed if electrical device 108 comprises a fan, etc.) or can be gated to provide substantially no current thus essentially switching off electrical device 108.

Electrical energy can be provided to electrical device 108 by the phase (O) and neutral (N) terminals. With mechanical switch 114 closed, the electrical energy can be controlled by TRIAC 116 to switch on electrical device 108, increase or decrease the intensity of electrical device 108 or switch off electrical device 108. When mechanical switch 114 is open, no current flows through electrical device 108. Opening up mechanical switch 114 is referred to as a "hard switch off" which allows a user to, for instance, change or replace a lamp in electrical device 108 without risk of an electrical shock.

Dimmer 100 includes microprocessor 126 which can be coupled to zero-crossing detector circuit 112 and user interface circuit 128. Microprocessor 126 can control the operation of TRIAC 116. Microprocessor 126 can be a well known off the shelf processor semiconductor integrated circuit (i.e., microprocessor "chip") or a control circuit designed to perform certain actions depending on the status of various of its inputs or a combination of a microprocessor and a control circuit. The electrical energy flowing through electrical device 108 can be a 120/220 volt AC (alternating current), 60/50 Hz signal. The AC signal (current and/or voltage) may be a sinusoidal voltage signal symmetrically alternating about a zero volt reference point, described in further detail below with reference to FIG. 2. The AC signal flowing through phase wire 104, air gap switch 114, TRIAC 116 and load wire 106 is applied to the input of zero-crossing detector 112. Zero-crossing detector circuit 112 detects the zero-crossings of the line signal which occur every half cycle. Microprocessor 126 uses the output of zero-crossing detector 112 for various timing functions such as the proper timing of signals it generates to control TRIAC 116. Dimmer 100 has a power supply circuit 110 coupled to the phase and load wires. Power supply 110 uses well known circuits that are used to convert an AC signal to a direct current (DC) (or voltage) that may be used to power electronic circuits. Zero-crossing detector 112 can be implemented with diodes and resistors. The AC signal on the load wire 106 can be applied to a resistor which acts as a current limiting resistor. Diodes serve to limit the AC signal to a relatively small voltage that can be handled by microprocessor 126. For instance, at each zero-crossing of the AC signal, diode(s) limit an ensuing positive half cycle to +5 volts or an ensuing negative half cycle to approximately zero volts. The resulting signal thus switches from zero volt to 5 volts or from 5 volts to zero volts at each zero-crossing of the AC signal.

Microprocessor 126 can control TRIAC 116 through control line 115. The microprocessor can control the amount of current flowing through electrical device 108 by applying a certain signal to the gate of TRIAC 116 through control line 115. For example, microprocessor 126 can cause bursts of the AC signal to go through TRIAC 116 by switching ON and switching OFF TRIAC 116 at a desired rate. The switch ON time period may be equal to, less than, or more than the switch OFF time period. The amount of current flowing through electrical device 108 will depend on the duty cycle (ratio of switch ON time period to switch OFF time period) of the microprocessor-generated signal applied to the gate of TRIAC 116 and, thus, the intensity of electrical device 108, such as the intensity of light emitted if electrical device 108 comprises a lighting element, also will depend on this signal.

A user can operate dimmer 100 to control electrical device 108 by engaging user accessible actuators 128 which are depicted as three switches S1, S2 and S3. The actuators can be any mechanical, electromechanical, electro-optical device that is controllable by a user. For example the actuators can be a rotating wheel mechanism(s) that allow a user to control the intensity of electrical device 108 or turn ON or OFF electrical device 108. The actuators may enable a user to control predetermined aspects of the electrical device 108. For example, if electrical device comprises a light bulb, switch S1 may be an ON/OFF switch for the electrical device, switch S2 may be an intensity switch to increase the intensity of light emitted by the light bulb, and switch S3 can be an intensity switch used to decrease the intensity of light emitted by the light bulb. The switches can be "micro switches" that may be mounted on a printed circuit board disposed within a circuit housing of the dimmer.

During normal operation, air gap switch 114 is closed allowing current flow to electrical device 108 when TRIAC 116 is switched on by microprocessor 126. When a user engages switch S1 to either switch ON or OFF electrical device 108, microprocessor 126 detects this action by the user and interprets the user's command and, in response, turns ON or OFF electrical device 108. Processor 126 can switch electrical device 108 ON or OFF by providing an appropriate signal to the gate of TRIAC G through control line 115. Similarly, when a user engages either switch S2 or switch S3 to either increase or decrease the intensity of electrical device 108, microprocessor 126 applies a signal to the gate of TRIAC 116 via control line 115 to achieve the desired intensity. Microprocessor 126 also can activate a number of LEDs in a display circuit (not shown) to indicate the current intensity of electrical device 108. If a display circuit is included, when electrical device 108 is switched OFF, a status LED may be switched ON to notify the user that electrical device 108 is OFF and, in the case of a light, to allow the user to locate the dimmer that may be now in a darkened room. When electrical device 108 is ON, the status LED is OFF. Therefore, dimmer 100 is able to indicate the status of electrical device 108 through the use of a display circuit having LEDs and a separate ON/OFF indicator LED. For example, for a fan, the LEDs may be indicia of the speed at which the fan is currently rotating.

In dimmer 100 the ON/OFF switch S1 and the intensity control switches (S2, S3) may be operated by a user to implement specific commands, such as OFF, and ON.

When electrical device 108 is OFF and a user desires to switch it ON, the user can actuate ON/OFF switch S1 once (a single tap) causing one switch closure which is detected by microprocessor 126 which engages TRIAC 116 to switch ON electrical device 108 or to switch ON electrical device 108 at a particular fade rate where the electrical device intensity will reach a predefined preset level. The single tap is one tap followed by a pause of at least one second. The fade rate is a measure of how quickly (or how many times) the electrical device intensity changes from one intensity to another during a defined time period. The fade rate can be a programmed fade rate. The preset level is either a level programmed into the dimmer by the user while the dimmer was in a programming mode, or is a level selected by the user using the intensity switches prior to electrical device 108 being switched ON. It should be noted that the one switch closure caused by the user is, in one embodiment, interpreted as such by microprocessor 126 only when there is at least a one second pause following the switch closure. During the pause no switch closures are performed by the user. Multiple taps (in rapid succession of less than one (1) second between each tap) to the ON/OFF switch will not cause anything to occur.

Dimmer 100 can also have a dim-lock feature which can be turned on or off. The dim-lock feature is the ability for dimmer 100 to have electrical device 108 go to the same preset intensity level whenever the electrical device 108 is switched ON. When the dim-lock feature is ON, dimmer 100 causes electrical device 108 intensity (or brightness) to rise to a preset level when electrical device 108 is switched ON. While the dim-lock feature is ON, a user can temporarily override it by manipulating the intensity switches to temporarily select a new intensity level while electrical device 108 is OFF; then when electrical device 108 is switched ON, it will go to the new level either instantly or at a programmed fade rate. However, if electrical device 108 is switched OFF and then switched ON again, it will revert back to the programmed preset level due to the dim-lock feature. The dim-lock feature can be turned OFF if, while programming the preset level, the user selects an intensity preset level that is so low that electrical device 108 will effectively be turned OFF if set at that level. When the dim-lock feature is OFF, the user can select the preset level by manipulating the intensity switches while the electrical device is OFF and then when the electrical device is switched ON, it will go to that preset level.

The user also can press and hold switch S1 for a period of time (for example, three seconds or more), microprocessor 126 will switch ON electrical device 108 by proper gating of TRIAC 116 causing electrical device 108 to turn ON at a first fixed fade rate that cannot be changed by the user. This first fixed fade rate (e.g., 10 sec.) can be set by the manufacturer of dimmer 100 and the user may, in some embodiments, not be able to modify it. Furthermore, when switch S1 is pressed and held, electrical device 108 will go to a fixed intensity level different from the preset level programmed by the user. The fixed level may, in some embodiments, not be changed by the user, but can be set by the manufacturer of dimmer 100. It should be noted that when either of the intensity switches or the ON/OFF switch is actuated while electrical device 108 is fading up from an OFF state, electrical device 108 can return to the OFF state.

When electrical device 108 is ON and a user desires to switch it OFF, the user can actuate the ON/OFF switch S1 once (a single tap) causing one switch closure (to be followed by at least 1 second of no switch closures) which can be detected by microprocessor 126 which engages TRIAC 116 appropriately to switch OFF electrical device 108 or to switch OFF electrical device 108 at a particular fade rate. The fade rate can be programmed into dimmer 100 by the user while the dimmer is in a programming mode.

The user also can press and hold switch S1 for a period of time (for example, one second or more), and microprocessor 126 can switch OFF electrical device 108 by proper gating of TRIAC 116. Electrical device 108 may be switched OFF (without fading) after a delay (defined by the manufacturer) where such delay has no relationship with the length of time switch S1 was held. The delay can be a fixed delay and after such delay has elapsed, electrical device 108 can be abruptly switched off, such that there is no fade. When the dim-lock feature is OFF as explained above and the user decreases the intensity of electrical device 108 to a new level through the manipulation of the intensity switches, the new level can become the new preset level. This new preset level can be changed if (1) the user once again changes the intensity level while the electrical device is on; (2) switches off the electrical device and changes the intensity level while the electrical device is OFF or (3) enters into the programming mode and turns on the dim-lock feature to establish a preset level different from the new level. It should again be noted that while electrical device 108 is fading due to the user operating either the intensity switches or the ON/OFF switch the user can stop the fading by pressing once either the ON/OFF switch or any of the intensity switches. In this scenario, electrical device 108 can revert to the intensity immediately prior to the start of fading.

In the operation of the intensity switches while electrical device 108 is ON, each actuation of the intensity switches by the user can be interpreted as a command to either increase or decrease intensity depending on which intensity switch was operated. Microprocessor 126 can be programmed to increase or decrease the intensity of electrical device 108 by a predefined amount after an intensity switch actuation. In that example, there are no fade rates associated with one actuation to "increase intensity" or one actuation to "decrease intensity" command. That is, actuation of either of the intensity switches will not cause electrical device 108 to fade. Instead, electrical device 108 will instantly change intensity to a next intensity level (for instance, in the case of a light, the light will brighten or dim to a next brightness level). Microprocessor 126 will then cause the intensity of electrical device 108 to increase or decrease after having recognized the one actuation of either S2 or S3. Thus, a user can increase intensity (or decrease intensity) with the use of a series of single actuations of S2 (or S3). The one actuation of either of the intensity switches can comprise a switch closure followed by at least a one second pause. Multiple switch closures with pauses of less than one second between closures may, in some embodiments, not be recognized by the dimmer. In that case, multiple switch closures in relatively rapid succession will not cause any operation to be performed by dimmer 100.

Conventional zero-crossing detection methods (such as the method described above) operate by detecting a change in voltage polarity of an input voltage. A change in polarity of the input voltage, which necessitates crossing of the zero voltage level by the input voltage, can result in false triggering due to signal noise as described below with reference to FIG. 2.

Figure 2:
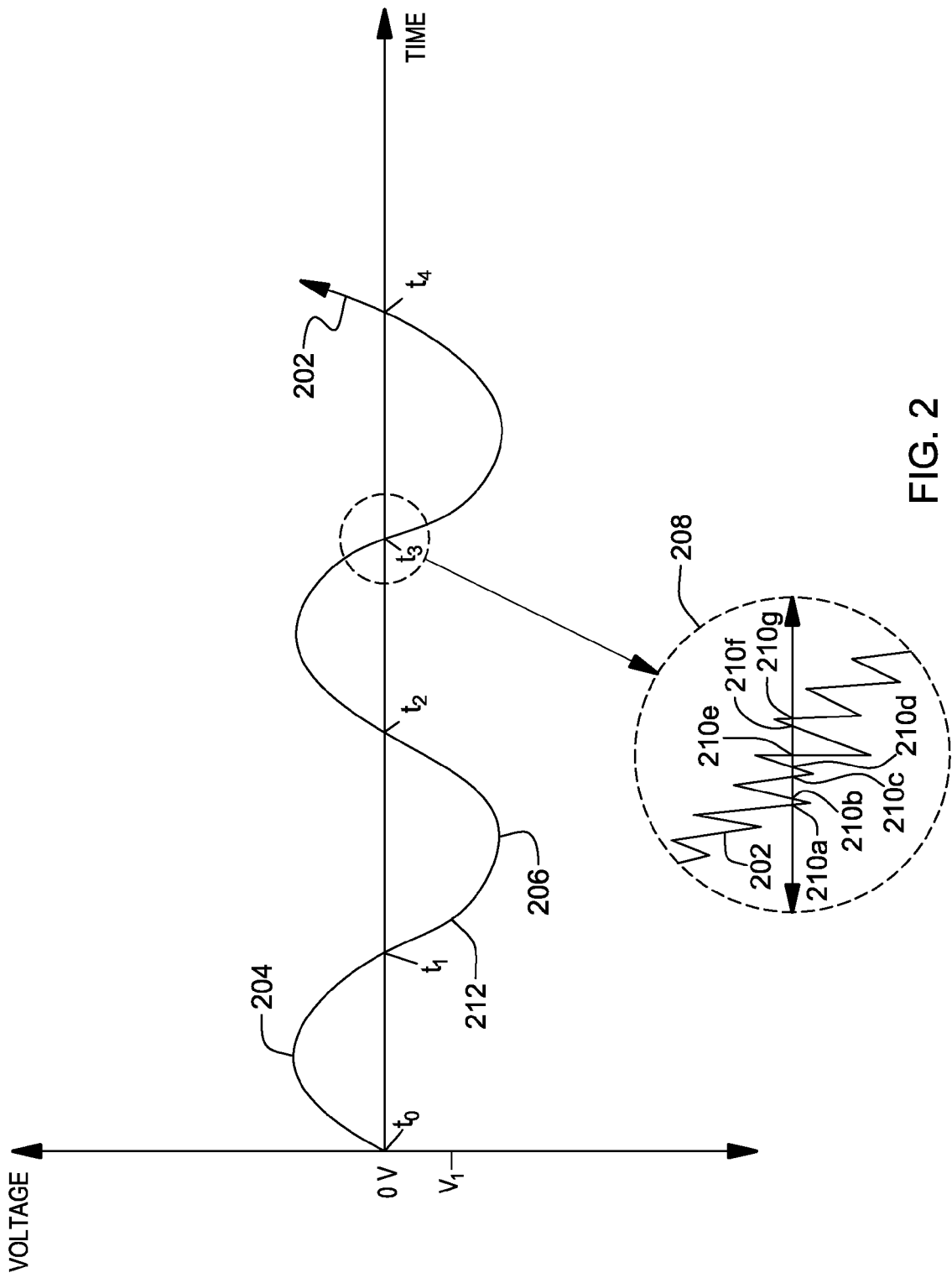
FIG. 2 depicts one example of a voltage signal diagram for an electrical power phase.

FIG. 2 depicts one example of a voltage signal diagram for an electrical power phase. An AC electrical power phase (input line voltage) 202 has a voltage signal that oscillates between positive and negative voltage levels at a substantially regular frequency. Operating voltages generally, though not always, are set at between 100V and 240V, and have frequencies between 50 and 60 Hz. The electrical power phase 202 follows generally a sinusoidal pattern, having a repeating full phase (e.g. from time $t_0$ to time $t_2$, time $t_2$ to time $t_4$, etc.) and having repeating half-phases (e.g. positive half-phase 204, negative half-phase 206) of each full phase. The point(s) at which the electrical power phase 202 changes voltage polarity (e.g. from positive voltage to negative voltage, or negative voltage to positive voltage) is referred to as a zero-crossing and occurs when power phase 202 crosses the 0 voltage (0V) level. In FIG. 2, zero-crossings occur at times $t_0$, $t_1$, $t_2$, $t_3$, and $t_4$.

In practice, fluctuations in load current result in a noisy electrical power phase. This occurs in many different types of electrical devices, with some electrical devices (such as LED and CFL lamps with capacitive power supplies) experiencing more frequent reversals in load current about a zero-crossing than are experienced in other types of electrical devices, such as incandescent lamps. In general, the closer the voltage level of the phase is to 0V, the more noise that is experienced. As a result of this noise, multiple changes of polarity occur and are sensed when the electrical power phase transitions from one half-phase to another half-phase—for instance from a positive half-phase to a negative half-phase, or vice-versa. The magnified view 208 in FIG. 2 illustrates this. As electrical power phase 202 approaches the 0V level from the positive voltage level direction, and proceeds beyond the 0V level, several zero-crossings (210a, 210b, . . . , 210g) occur. Eventually, electrical power phase 202 completes the transition from positive half-phase to negative half-phase (in this example). This happens when phase 202 has progressed sufficiently beyond the 0V level such that spikes in the phase 202 do not reach above the 0V level. In FIG. 2, the last voltage polarity reversal occurs at 210g, and the transition has fully taken place only after occurrence of this last reversal.

Thus, it can be seen that noise results in several detections of zero-crossings when change in voltage polarity is sensed for detect zero-crossings. This can lead to undesirable 'false triggering' whereby one or more zero-crossings occur and are detected despite the electrical power phase 202 having not yet fully completed the transition from one half-phase to another half-phase. Resulting from this false triggering are potentially premature and undesired control actions by circuitry of the dimmer to control operation thereof. For instance, multiple zero-crossings detections (and signaling thereof) cause a relatively rapid firing of the switching circuit, e.g. the TRIAC (using the above example), and in some applications, such as LED dimming, this can be problematic, causing undesirable effects to the load, such as flickering, in the case where the load comprises one or more LED light bulbs.

In accordance with aspects of the present invention, power phase threshold detection is provided to improve the synchronization capabilities of the dimmer, and to avoid false triggering that occurs in the above-described approach. In accordance with aspects of the invention, rather than detect when the input line voltage crosses zero volts, threshold detection detects when the absolute value of the voltage level of the electrical power reaches a set voltage threshold, such as a pre-defined voltage threshold value. By placing this trigger point above (or below) zero volts, false triggering due to the multiple voltage polarity reversals caused by the fluctuations in load current near zero is avoided. While current changes (from increasing to decreasing and vice-versa) can occur away from the zero-voltage level, these changes are small enough that they do not cause polarity reversals and can be ignored. The significant fluctuations of the load current near the voltage level diminish once the line voltage has had a chance to rise above the zero potential.

Figure 3:
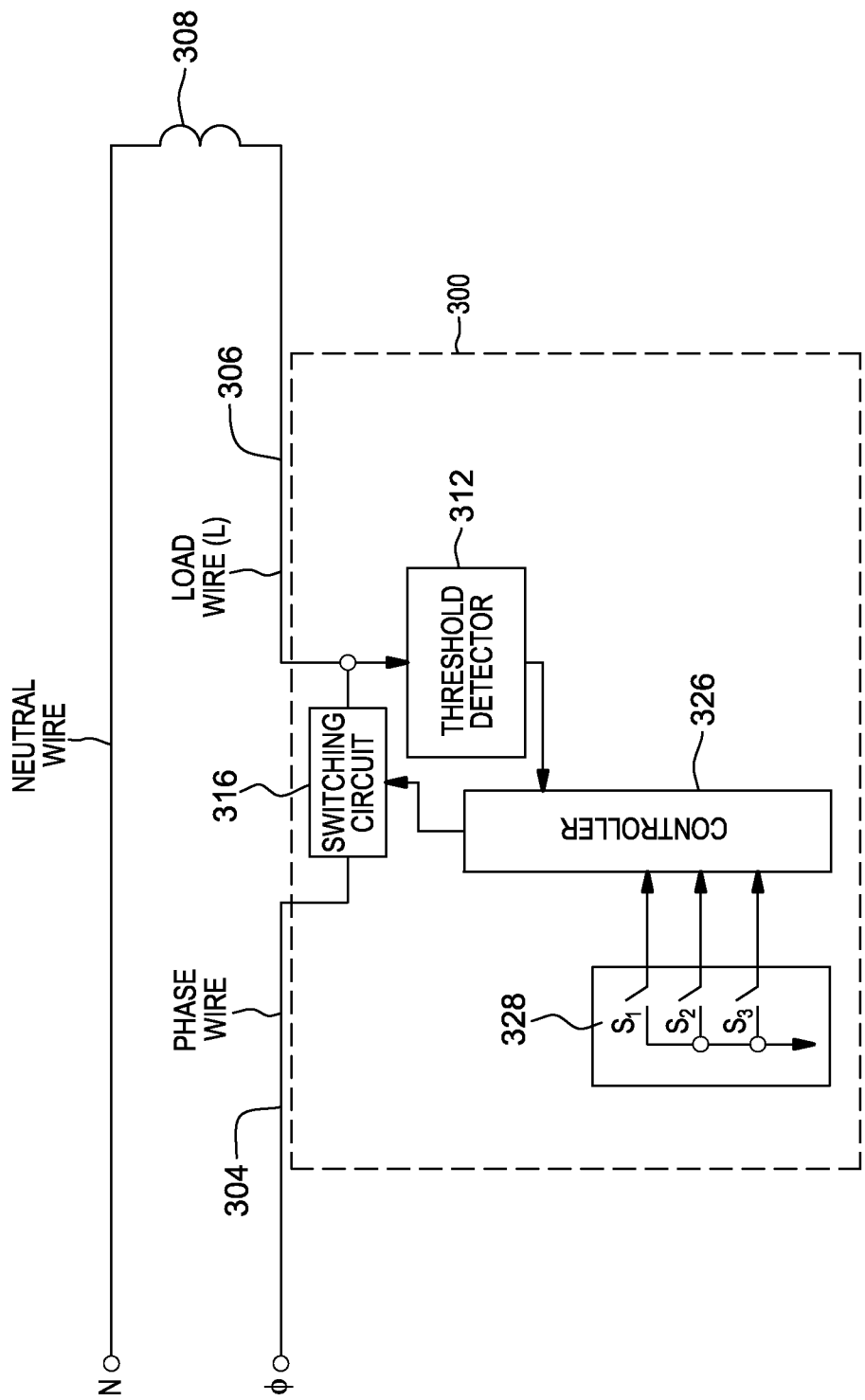
FIG. 3 depicts one example of a dimmer for controlling electrical power to a load, in accordance with one or more aspects of the present invention.

FIG. 3 depicts one example of a dimmer for controlling electrical power to a load, in accordance with one or more aspects of the present invention. In the example of FIG. 3, dimmer 300 includes actuators 328 for performing actions to control dimmer 300, such as described above in connection with the dimmer embodiment of FIG. 1. Additionally, actuators 328 can be used for programming functions to program dimmer 300, as described in further detail below. It should be understood that while three switches S1, S2 & S3 are depicted in FIG. 3, dimmer 300 could include any number of switches or other use-accessible actuators 328 for controlling dimmer 300.

Dimmer 300 includes line input terminal 304 to facilitate connection to a source of electricity (via a phase wire) and load output terminal 306 to facilitate connection to a load (via a load wire). Switching circuit 316 is electrically coupled between line input terminal 304 and load output terminal 306 for controlling supply of electrical power to load 308. Controlling the supply of electrical power to load 308 may be accomplished through any suitable means, for instance by way of one or more TRIACs, as described above with reference to FIG. 1.

Dimmer 300 further includes a controller 326, such as a microprocessor, for providing one or more signals to switching circuit 316, to control the switching of electrical power to load 308. This controlled switching can be based on zero-crossing indications received from power phase threshold detector 312. Power phase threshold detector 312 detects when a power phase voltage level of the power phase of the electrical power supplied over phase wire 304 reaches a set voltage threshold level, and signals controller 326 upon reaching this set voltage threshold.

Power phase threshold detector 312 can detect when the power phase voltage level reaches a positive non-zero voltage threshold and/or a negative non-zero voltage threshold. (Note that as used herein, voltage threshold refers to an actual voltage value, rather than a root mean square (RMS) voltage value.) When the input line voltage transitions from a positive half-phase to a negative half-phase, detector 312 can detect when the power phase reaches a negative voltage threshold. In such a scenario, the input line voltage approaches 0V from the positive direction and as it transitions from the positive half-phase to the negative half-phase, multiple zero-crossings (polarity reversals) occur, as described above. However, threshold detector 312 can be configured to provide a zero-crossing indication to the controller only after the input line voltage reaches the negative voltage threshold. In this manner, the timing of an indication of a zero-crossing is delayed with respect to the voltage polarity reversals of the phase.

Threshold detector 312 can behave in an analogous manner when the input line voltage transitions from a negative half-phase to a positive half-phase, where detector 312 can detect when the power phase reaches a positive voltage threshold, and can provide a zero-crossing indication to the controller after the input line voltage reaches this positive voltage threshold.

A zero-crossing indication received from threshold detector 312 provides an indication of occurrence of a zero-crossing of the electrical power phase and of completion of the transition of the power phase from one half-phase to another half-phase thereof. That is, during the transition, multiple reversals in voltage polarity are experienced, corresponding to multiple actual zero-crossings (see above FIG. 2). The zero-crossing indication provided by the threshold detector 312 can indicate that the transition has completed. For example, the indication can indicate to controller 326 that the last of the zero-crossings, local to that particular transition from the one half-phase to the other half-phase, have completed.

The threshold voltage values at which the threshold detector will signal an indication can be tailored according to the particular circumstances of the application. For instance, characteristics of the input electrical power, such as input line voltage and/or frequency thereof, may influence the value at which the voltage threshold is set. Additionally, dimmer settings such as the load dim amount, corresponding to the amount of electrical power to provide to the load, can influence where this voltage threshold is set. In one example, it is advantageous to set the threshold level as low as possible while avoiding the zero-crossing detection problems described above.

Zero-crossing indication(s) from a threshold detector in accordance with aspects of the present invention can be used for various timing functions, such as for proper timing of signals to be provided to the controller to facilitate controlling a switching circuit of the dimmer, as described above. The threshold detector can provide indications about the voltage signal level of an alternating current at particular times during the sinusoidal oscillation of the alternating current power phase, for controlling timing of the firing of the switching circuit. The timing of signals to fire the switching circuit will affect the amount of current flowing through the load which, in the case of a light bulb, will affect the brightness of the light emitted therefrom. In one example, should maximum brightness be desired, the switching circuit can be fired immediately by the controller when the controller receives the indication that a zero-crossing has occurred (e.g. upon reaching the threshold), so that the switching circuit can be engaged for the longest period of time before the power phase again transitions to a next half-phase. In contrast, a delay in firing the switching circuit after a zero-crossing indication is received will engage the switching circuit for a lesser duration of time during the half-phase before the next transition, and will result in less current draw and, in the case of a light bulb, a dimmer light.

Additionally with respect to the timing functions of the dimmer, any particular non-zero voltage threshold value will have associated with it a portion/percentage of the half-phase of the electrical power that has already passed before the power phase reaches the voltage threshold. For instance, referring to FIG. 2, point 212 of electrical power phase 202 corresponds to a negative voltage value $V_1$. If $V_1$ is the voltage threshold at which the threshold detector is configured to indicate a zero-crossing when the input line voltage transitions from positive half-phase to negative half-phase, then it is seen that a time delay is associated with that point 212. The time delay extends from the approximate time that the input line voltage transitions from positive half-phase 204 to negative half-phase 206 (approximated by time t1) to the time at which the voltage level of the power phase reaches point 212, and corresponds to the portion of negative half-phase 206 which has passed from time $t_1$ to the time where the phase reaches point 212. Thus, when the zero-crossing indication threshold voltage is set above or below zero volts, the zero-crossing detection indication is delayed in comparison to the timing of the 'actual' zero-crossing (approximated by $t_1$). This delay from the 'actual' zero-crossing time can be predetermined and pre-calculated (for instance based on the frequency of the electrical power phase) and used to compensate the dimmer firing delays accordingly, for instance in carrying out timing functions of the dimmer. By way of specific example, for a preselected voltage threshold $V_T$, a input line peak voltage $V_P$, and power phase frequency f, the delay time (in seconds) is approximately equal to:

$$t = \frac{1}{2\pi f} \sin^{-1}\left(\frac{V_T}{V_P}\right)$$

For a 60 Hz power phase, the delay time in seconds would be:

$$t = 2.653 \sin^{-1}\left(\frac{V_T}{V_P}\right) \approx 2.653 \frac{V_T}{V_P}$$

By using this estimation, the time elapsing between the 'actual' zero-crossing and the moment of detection can be estimated. The voltage threshold level can be pre-selected based on a desired amount of time delay t after occurrence of the transition from one half-phase to another half-phase.

There is a tradeoff between immunity to false triggering and time delay that results depending on the choice of voltage threshold. Higher voltage thresholds result in more immunity to false triggering (that is, false triggering that a transition from one half-phase to a next half-phase has completed), but higher voltage thresholds result in longer delays in detecting the transition compared to when the actual zero-crossing(s) occur. In some applications, a good balance is reached with a threshold voltage in the range of 35V to 50V and even more particularly between 42V-44V, which can provide high resistance to false triggering and minimize the time delay. For example, with a threshold of 42V, the time delay is approximately 0.662 milliseconds. In one example, the non-zero voltage threshold comprise a value in a range of 20% to 30% of peak voltage of the electrical power.

Several methods are available to implement a threshold function in the threshold detector circuitry. In particular embodiments, threshold detector circuitry is configured to adapt the input line voltage signal to a digital signal. This analog-to-digital conversion is used to indicate whether the input line voltage is above or below the desired threshold voltage. For instance, when the input line voltage is above the threshold, the threshold detector indicates a '1' and when the input line voltage is below the threshold, the threshold detector indicates a '0'. This indication is provided to the controller for controlling the switching circuit. Multiple implementations of such a threshold detection circuitry are described below with reference to FIGS. 4A-6.

Figure 4A:
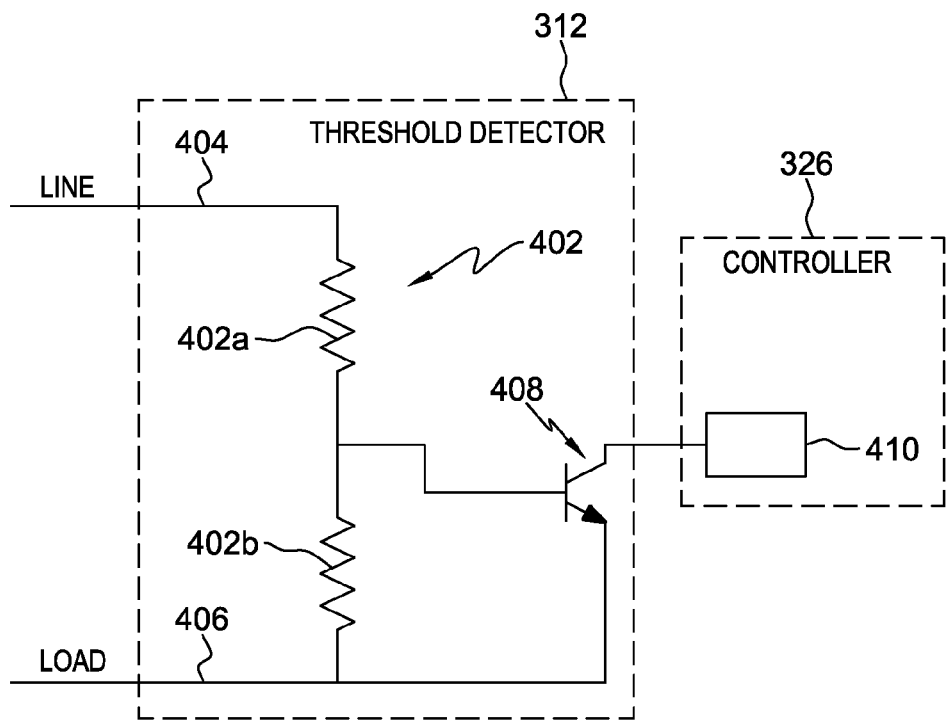
FIG. 4A is a circuit diagram of one embodiment of a power phase threshold detector for the dimmer of FIG. 3, in accordance with one or more aspects of the present invention.
Figure 4B:
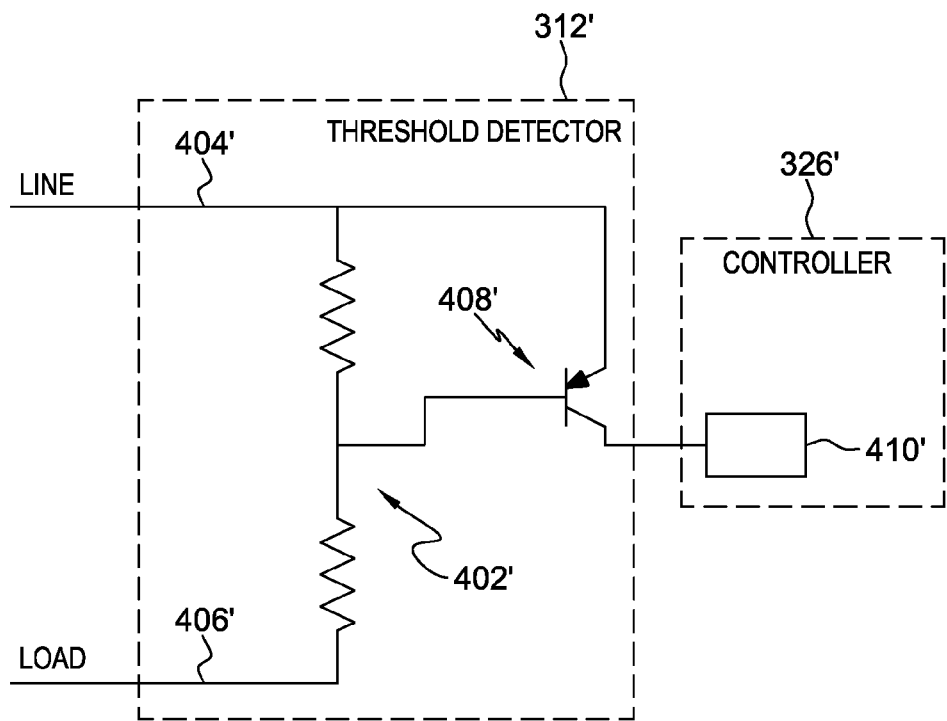
FIG. 4B is a circuit diagram of another example of a power phase threshold detector for the dimmer of FIG. 3, in accordance with one or more aspects of the present invention.

FIGS. 4A and 4B each depict a circuit diagram of a power phase threshold detector for the dimmer of FIG. 3. In these examples, a voltage divider and a signaling component in the form of a transistor are provided, where the transistor signals a zero-crossing indication to the controller. In FIG. 4A, a resistor voltage divider 402 is connected across the line input 404 and load output 406 terminals (for instance the phase and load wires as in FIG. 3). Resistor voltage divider 402 includes two resistors 402a and 402b wired in series between line input terminal 404 and load output terminal 406. Resistor voltage divider 402 is used to drive the base of a transistor 408, which is wired between the two resistors 402a and 402b of resistor voltage divider 402. The emitter of transistor 408 is connected across a common supply (load output 406 in FIG. 4A) while the collector of transistor 408 signals a zero-crossing indication to zero-crossing indication input 410 of controller 326. In one specific example, zero-crossing indication input 410 comprises a zero-crossing detection pin of controller 326.

The voltage divider 402 is set to multiply the base threshold of transistor 410 to the desired line-input threshold voltage. Transistor 410 is then driven to switch state when the line input voltage crosses this threshold voltage.

In the example of FIG. 4B, similar reference numerals are used (with prime indications) to denote similar components as those of FIG. 4A. In FIG. 4B, voltage divider 402' is used to drive the base of transistor 408', while the emitter of transistor 408' is connected across line input 404'. The collector of transistor 408' signals a zero-crossing crossing indication to zero-crossing indication input 410', as in FIG. 4A.

In FIGS. 4A and 4B and the accompanying description, the signaling component comprises a bipolar junction transistor. In an alternative approach, the signaling component could comprise a different type of transistor, such as a field-effect transistor (FET). When a FET is used, the configuration is the same as above except that resistor voltage divider (e.g. 402) drives the gate of the FET, the source of the FET is connected across the common supply, and the drain signals a zero-crossing indication to zero-crossing indication input of the controller.

Figure 5:
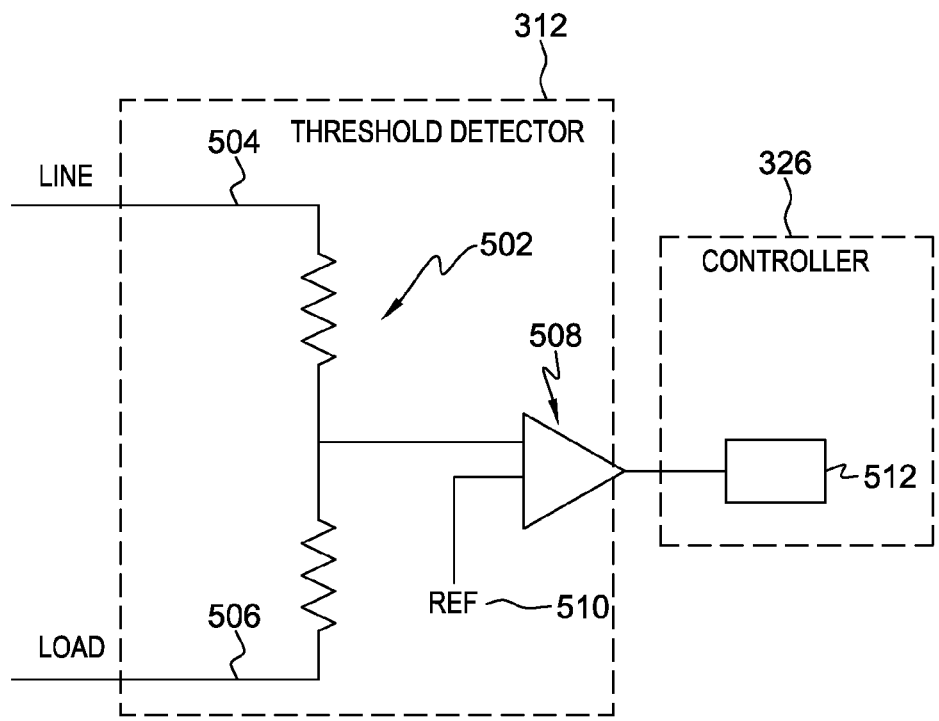
FIG. 5 is a circuit diagram of yet another example of a power phase threshold detector for the dimmer of FIG. 3, in accordance with one or more aspects of the present invention.

While the transistor methods of FIGS. 4A and 4B have a cost advantage over other methods, in that transistors are relatively inexpensive components, a transistor is generally slower than a comparator. FIG. 5 depicts a circuit diagram of another example of a power phase threshold detector for the dimmer of FIG. 3, in which a comparator method is provided. In the example of FIG. 5, a voltage divider and a signaling component in the form of a comparator are provided. The comparator in this example signals a zero-crossing indication to the controller.

In FIG. 5, resistor voltage divider 502 is connected across line input 504 and load output 506 terminals. Resistor voltage divider 502 drives one input of comparator 508, and a reference voltage 510 drives another input of comparator 508. Voltage divider 502 and reference voltage 510 are selected to permit the comparator output to change state when the line input voltage crosses the desired threshold voltage. Such change of state provides zero-crossing indications to a zero-crossing indication input 512 of controller 326, as in FIGS. 4A and 4B. The comparator has the advantage of being a generally faster and more accurate component than a transistor, however a comparator tends to be a more expensive component than a transistor. In this regard, selection of a proper signaling component can be implementation or application specific and tailored according to the monetary and/or accuracy constraints of the particular situation.

In the examples of FIGS. 4A-4B and 5, the signaling component is depicted as being separate from the controller 326. However, in other embodiments of the present invention, one or more components of the threshold detector may be implemented directly within the controller. For instance, the signaling component, such as the transistor or comparator, can be included within controller 326, with a voltage divider providing an input to, e.g. an input pin of, the signaling component of controller 326. Additionally or alternatively, a potentiometer may be used to implement the voltage divider, rather than in-series resistors, as will be appreciated by those having ordinary skill in the art.

Figure 6:
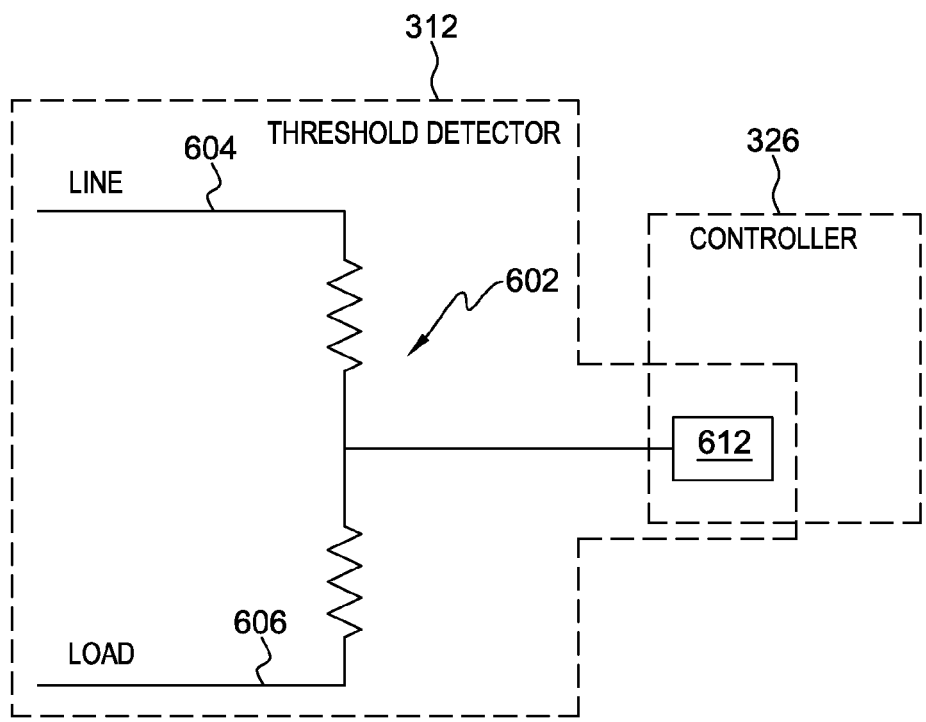
FIG. 6 is a circuit diagram of a further example of a power phase threshold detector, in accordance with one or more aspects of the present invention.

FIG. 6 depicts a circuit diagram of a further example of a power phase threshold detector. In this example, signaling component 612 comprises controller logic of controller 326 for providing zero-crossing indication(s) to controller 326. In FIG. 6, resistor voltage divider 602 is connected across line input 604 and load output 606 terminals to drive controller logic 612 of controller 326. For instance, resistor voltage divider 602 is connected to controller 326 via a digital input pin of controller 326 which is used to drive controller logic 612 of controller 326. Voltage divider 602 triggers digital input pin to drive controller logic 612 when the line input voltage crosses the desired threshold voltage. While, this method has an advantage of being a relatively simple hardware configuration, it can be difficult to reliably say what exact threshold is the point at which resistor voltage divider 602 will trigger the digital input pin to drive controller logic 612 of the controller.

In the above examples, the resistors of the voltage divider attenuate the input line voltage to a voltage at which the other components, e.g. transistor/comparator, work. Additionally, the particular transistor/comparator selected for inclusion in the threshold detector can be selected so that it switches when the particular voltage threshold is input to the threshold detector. This enables components having relatively low operating voltages (voltages at which the transistor/comparator will switch) to be incorporated into the threshold detector.

For completeness, additional features and functions of a dimmer 300 are described below, for example, related to control of the operation thereof.

Electrical loads, such as LED lamps, turn off when the input voltage drops below a minimum operating level. For some LED lamps, this turn-off voltage may be lower than the voltage required to turn back on the LED lamp. When the turn-off voltage is significantly lower than the turn-on voltage, meaning that a user can dim the LED lamp down to between the turn-off and turn-on voltages, problems can occur. For instance, if the dimmer is switched off when the voltage is positioned between the turn-off and turn-on voltages, the voltage when the dimmer is switched back on is below the level needed to turn on the LED, and consequently, the lamp will fail to turn on.

A kick-start function provides one solution to this problem. The kick-start function, in one example, is executed by the controller and advantageously can power-on the load by applying a sufficient voltage level when the switching circuit is switched to supply power to the load, regardless of the dimmer being set to dim the load to below a minimum voltage level sufficient to power-on the load. The kick-start function applies a voltage above the minimum turn-on voltage for a short period when the lamp is switched on, which will start the lamp. The lamp can then be ramped slowly to the desired dimming level.

Parameters that affect the kick-start function include its intensity and duration. In one particular embodiment of the present invention, a dimmer provides a choice of three modes for three different load scenarios which adjust these parameters. The three different load scenarios correspond to three different types of lamps: some lamps do not require any kick-start, some require a relatively weak kick-start, and others require a relatively strong kick-start. To accommodate these different load types, a dimmer in accordance with aspects of the present invention supports FADE-UP, FADE-DOWN, and KICKSTART MODES.

In FADE-UP mode, no kick-start function is provided. When the dimmer is switched on, the initial intensity of the dimmer is at minimum and ramps up slowly to the desired dimming level, which is set, in one embodiment, by an actuator of the dimmer, for instance by a slide potentiometer.

In FADE-DOWN mode, a mild kick-start function is provided. When the dimmer is switched on, the initial intensity of the dimmer is at a level between minimum and maximum and ramps slowly down (or up) to the desired dimming level set by the slide potentiometer.

In KICKSTART mode, a strong kick-start function is provided. When the dimmer is switched on, the initial intensity of the dimmer is set to a high level and held there for a duration of time. After elapse of this duration of time, the intensity ramps slowly down to the desired dimming level set by the slide potentiometer.

In one particular embodiment of the present invention, a dimmer in accordance with aspects of the present invention can provide ways to adjust the lower limit (minimum dimming level) of its dimming range. A slide potentiometer, for instance, typically selects a dimming level scaled between a lower limit (minimum intensity dimming level) and an upper limit (maximum intensity dimming level). A minimum intensity adjustment setting allows the user to select/set the intensity of this lower limit. The dimmer then can re-scale the dimming range to allow the slide potentiometer to control the dimming level smoothly between the maximum intensity and the newly set minimum intensity. MINIMUM INTENSITY adjustment is described below.

In one particular embodiment of the present invention, a dimmer in accordance with aspects of the present invention can provide the user with the ability to program and select their choice of KICK-START mode and MINIMUM INTENSITY level. Once selected, both choices can be stored in non-volatile memory of the dimmer. The choices can be made using known techniques for programming a dimmer, for instance by using one or more actuators of the dimmer (such as actuators 328 of FIG. 3) for programming the dimmer.

In one specific example, actuators of the dimmer can include a slide potentiometer, power toggle switch, and a programming switch of the dimmer, and can be used to program the dimmer according to a user-selected configuration. A programming switch is, in one example, a two-position slide switch, with one position (NORMAL position) corresponding to a NORMAL mode, and the other position (PROGRAM position) corresponding to a PROGRAM mode.

Using the above example, the MINIMUM INTENSITY level may be set by a user via a minimum intensity adjustment setting. This can be accomplished when the dimmer is in an OFF state and the program switch is in the NORMAL position. The following steps can then be employed to set the MINIMUM INTENSITY level: First, the dimmer is turned on with the power toggle switch. Then, the programming switch is slid to the PROGRAM position. The user then adjusts the desired minimum level using the slide potentiometer. Following this, the programming switch is slid back to the NORMAL position, and the minimum level is saved at that point in memory of the dimmer.

Also using the above example, the KICK-START MODE may also be set by a user using the following steps: With the dimmer in the OFF state, the programming switch is slid to the PROGRAM position. Then, the user chooses the desired kick-start mode using the slide potentiometer before turning the dimmer on: The slide potentiometer being slid all of the way down corresponds to the FADE-UP mode, whereas the slide potentiometer being slid to somewhere near the middle corresponds to FADEDOWN mode, and the slide potentiometer being slid to all of the way up corresponds to KICK-START. Once the desired kick-start mode is chosen, the dimmer is turned on, to observe the selected kick-start mode, the programming switch is slid back to the NORMAL position, and the kick-start mode is saved at that point in memory of the dimmer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A dimmer for controlling AC electrical power to a load, the dimmer comprising:
    a line input terminal and a load output terminal;
    a switching circuit electrically coupled between the line input terminal and the load output terminal; and
    a threshold detector configured to:
        (a) detect when absolute value of a voltage level of the AC electrical power rises above a non-zero voltage threshold indicative of an occurrence of a zero-crossing of the AC electrical power, wherein the non-zero voltage threshold corresponds to a time delay (t) in a cycle of the AC electrical power after the occurrence of the zero-crossing of the AC electrical power; and
        (b) output a zero-crossing signal indicative of the occurrence of the zero-crossing of the AC electrical power;
    wherein the switching circuit is controlled at least partially by the zero-crossing signal output by the threshold detector.

2. The dimmer of claim 1, wherein the threshold detector further comprises one or more selected from the group consisting of a voltage divider, a comparator, and a transistor.

3. The dimmer of claim 1, wherein the threshold detector further comprises a signaling component, the signaling component configured to output the zero-crossing signal, and wherein the signaling component comprises at least one selected from the group consisting of a transistor, a comparator, and a controller logic.

4. The dimmer of claim 1, wherein the time delay (t) is calculated according to the equation:

$$t = \frac{1}{2\pi f} \sin^{-1}\left(\frac{V_T}{V_P}\right),$$

wherein f is a frequency of the AC electrical power, $V_T$ is the non-zero voltage threshold, and $V_P$ is a peak voltage of the AC electrical power.

5. The dimmer of claim 1, wherein power is delivered to the load during a predetermined portion of the cycle of the AC electrical power with respect to the zero-crossing of the AC electrical power calculated based on the zero-crossing signal and the time delay (t).

6. The dimmer of claim 1, wherein non-zero voltage threshold comprises a value in a range of 20% to 30% of a peak voltage of the AC electrical power.

7. The dimmer of claim 1, wherein the AC electrical power comprises a 120 volts alternating current, and wherein the non-zero voltage threshold comprises a value in a range of 35 to 50 volts.

8. The dimmer of claim 1, wherein the load comprises at least one light emitting diode.

9. The dimmer of claim 1, further comprising a minimum dimming level, wherein if the minimum dimming level is below a minimum voltage level sufficient to power-on the load, the switching circuit is configured to supply a sufficient voltage level to power-on the load.

10. The dimmer of claim 1, wherein the dimmer has a dimming range between a minimum intensity dimming level and a maximum intensity dimming level, and wherein the dimmer further comprises a minimum intensity adjustment setting to set the minimum intensity dimming level of the dimming range.

11. The dimmer of claim 1, further comprising a programming switch for programming at least one of a kick-start mode or a minimum intensity dimming level of the dimmer.

12. A method of controlling AC electrical power to a load, the method comprising:
    detecting when absolute value of a voltage level of the AC electrical power rises above a non-zero voltage threshold, the non-zero threshold being indicative of an occurrence of a zero-crossing of the AC electrical power, wherein the non-zero voltage threshold corresponds to a time delay (t) in a cycle of the AC electrical power after the occurrence of zero-crossing of the AC electrical power;
    outputting a zero-crossing signal indicative of the occurrence of the zero-crossing of the AC electrical power; and
    providing power to the load based at least partially on the zero-crossing signal.

13. The method of claim 12, wherein the step of detecting when the absolute value of the voltage level of the AC electrical power rises above a non-zero voltage threshold further comprises detecting the voltage level of the AC electrical power by using one or more selected from the group consisting of a voltage divider, a comparator, and a transistor.

14. The method of claim 12 wherein the outputting the zero-crossing signal further comprises using one or more from the group consisting of a transistor, a comparator, and controller logic to generate the zero-crossing signal.

15. The method of claim 12 where the step of providing power to the load further comprises providing power to the load during a predetermined portion of the cycle of the AC electrical power with respect to the zero-crossing of the AC electrical power calculated based on the zero-crossing signal and the time delay (t).

16. The method of claim 12, wherein the time delay (t) is calculated according to the equation:

$$t = \frac{1}{2\pi f} \sin^{-1}\left(\frac{V_T}{V_P}\right),$$

wherein f is a frequency of the AC electrical power, $V_T$ is the non-zero voltage threshold, and $V_P$ is a peak voltage of the AC electrical power.

17. The method of claim 12, wherein the AC electrical power comprises a 120 volts alternating current, and wherein the non-zero voltage threshold comprises a value in a range of 35 to 50 volts.

18. The method of claim 12, wherein the step of providing power to the load further comprises providing power to at least one light emitting diode.

19. The method of claim 12, wherein the method is implemented within a dimmer, wherein when the dimmer is set to provide power to the load below a minimum voltage level sufficient to power-on the load, the method further comprises applying a voltage level above the minimum voltage level sufficient to power-on the load.

20. The method of claim 19, wherein the voltage level is subsequently decreased to the set voltage level of the dimmer.

21. The method of claim 12, wherein the method is implemented within a dimmer, wherein the dimmer has a dimming range between a minimum intensity dimming level and a maximum intensity dimming level, and wherein the method further comprises providing a minimum intensity adjustment setting for setting of the minimum intensity dimming level of the dimming range.

22. The method of claim 12, wherein the method is implemented within a dimmer, and wherein the method further comprises providing a programming switch for programming at least one of a kick-start mode or a minimum intensity dimming level of the dimmer.

* * * * *